United States Patent [19]
Miller

[11] 4,093,398
[45] June 6, 1978

[54] WIND DRIVEN POWER MECHANISM

[76] Inventor: Denver W. Miller, 10208 SE. Tilford Rd., Boring, Oreg. 97009

[21] Appl. No.: 725,758

[22] Filed: Sept. 23, 1976

[51] Int. Cl.² .............................................. F03D 5/02
[52] U.S. Cl. .............................................. 416/8; 415/5
[58] Field of Search .................. 416/7, 8, DIG. 4; 415/5

[56] References Cited

U.S. PATENT DOCUMENTS

| 867,843 | 10/1907 | Schmidt | 416/8 |
| 2,517,135 | 8/1950 | Rudisill | 416/DIG. 4 |
| 3,957,390 | 5/1976 | Miller | 415/5 |

FOREIGN PATENT DOCUMENTS

| 122,356 | 4/1931 | Austria | 416/8 |
| 261,353 | 6/1913 | Germany | 416/7 |
| 308,132 | 3/1929 | United Kingdom | 416/8 |

Primary Examiner—Everette A. Powell, Jr.
Attorney, Agent, or Firm—Eugene M. Eckelman

[57] ABSTRACT

A base member is disposed longitudinally in the direction of wind movement and has a pair of parallel endless carriers on opposite sides thereof. These carriers are arranged to move over an upper arcuate run and along a lower straight return run. The upper ends of a number of sail-type vanes are connected between the two endless carriers, and the lower ends of the vanes are connected to rotatable idlers. In the operation of the mechanism, the upper ends of the vanes are lifted at the arcuate portion of the carriers to form sails and are collapsed in the return run, the upper ends of the vanes moving around the lower ends thereof with the latter ends rotating with the idlers.

2 Claims, 3 Drawing Figures

U.S.Patent June 6, 1978 4,093,398

WIND DRIVEN POWER MECHANISM

BACKGROUND OF THE INVENTION

This invention relates to improvements in wind driven power mechanisms.

Various wind driven power devices have heretofore been employed to utilize the natural forces of the wind for developing an output to drive generators, pumps, and the like. Such a device was disclosed in my prior U.S. Pat. No. 3,957,390. In my prior structure, I utilize a pair of endless carriers driven by flexible type sails connected thereto, the structure employing an outer carrier and an inner carrier. Structure was employed to disconnect the sails from the inner carrier as they approached the return run and structure was also employed to reconnected the sails to the inner carrier at the end of the return run.

SUMMARY OF THE INVENTION

According to the present invention, there is provided a wind driven power mechanism which is more simplied and more efficient than that shown in my prior patent. To carry out these objectives, a base is employed having endless carriers supported at opposite sides thereof. A plurality of flexible sail-type vane means are connected at their upper ends to these endless carriers whereby such ends of the vanes have movement along an upper run of said carriers in upright sail condition and have movement along a return run of said carriers in a collapsed condition uninfluenced by the wind. In my present invention, there is employed idler connecting means disposed between the upper and return runs to which the lower ends of said vanes means are connected, whereby the upper ends of the vanes travel around the idler connecting means and the latter rotate therewith.

The invention will be better understood and additional objects and advantages will become more apparent from the following description taken in connection with the accompanying drawings.

DETAILED DESCRIPTION OF A PREFERRED EMBODIMENT

Figure 1:
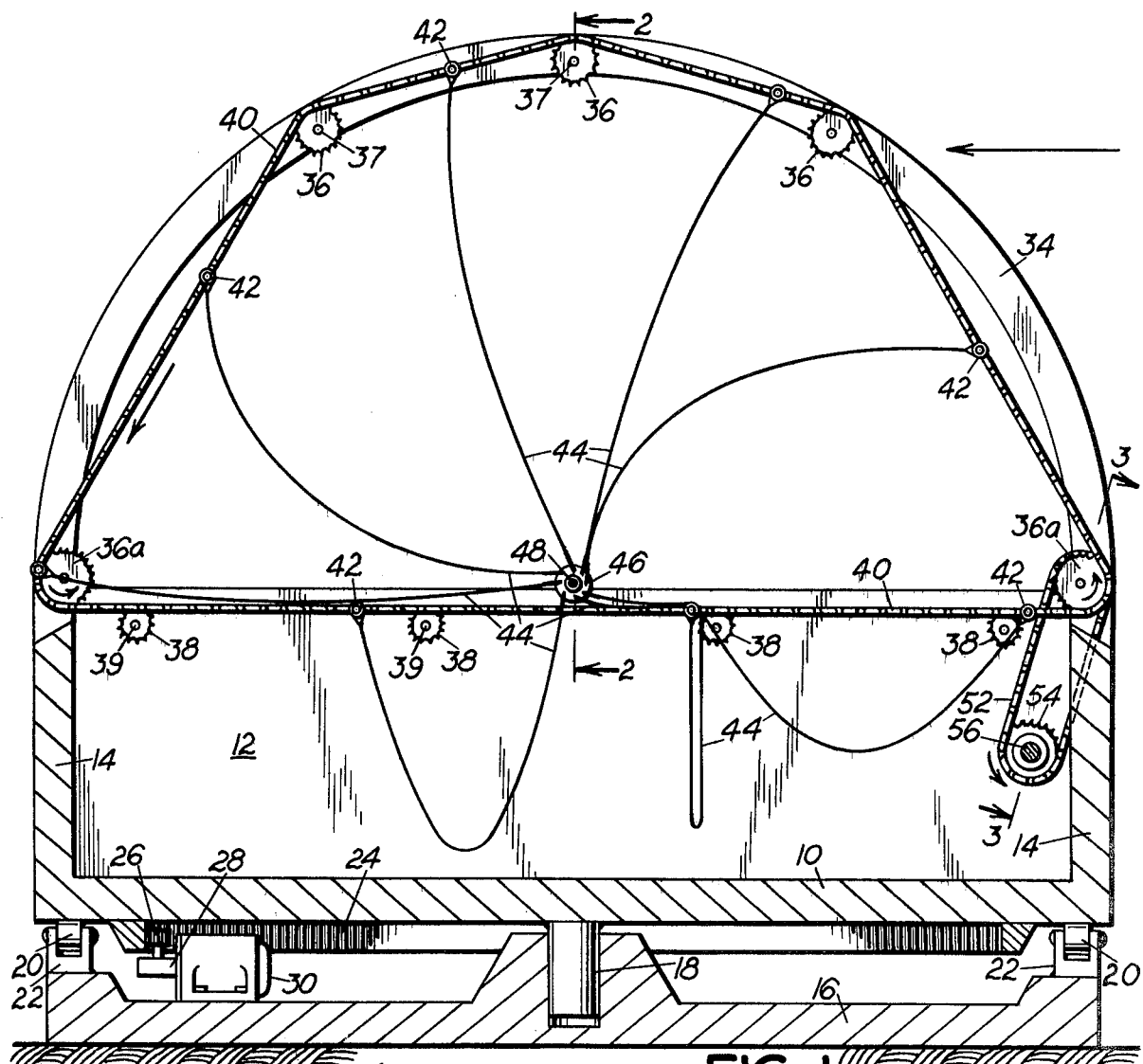
FIG. 1 is a vertical sectional view taken longitudinally of the present wind driven power mechanism.
Figure 2:
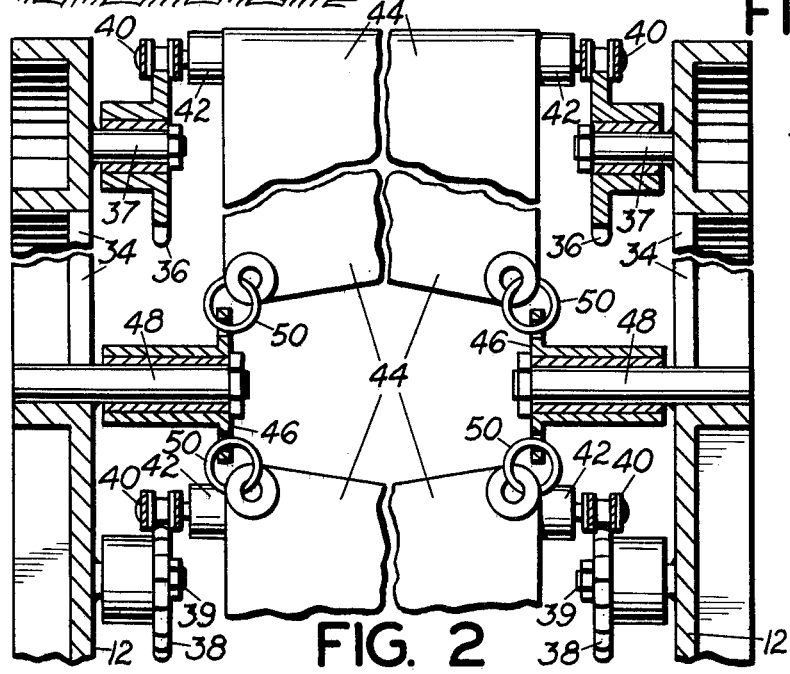
FIG. 2 is a fragmentary foreshortened enlarged sectional view taken on the line 2—2 of FIG. 1.
Figure 3:
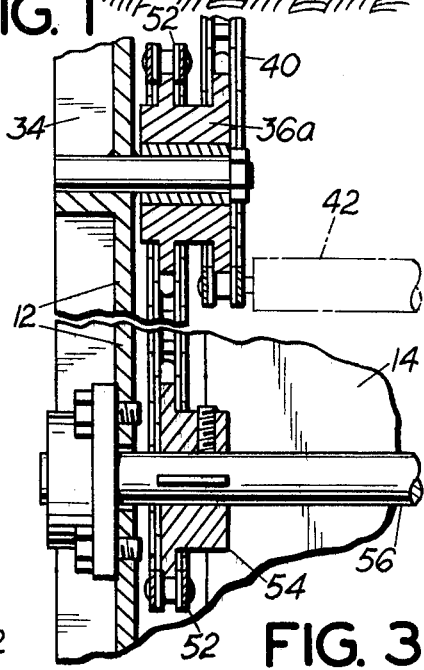
FIG. 3 is an enlarged fragmentary foreshortened sectional view taken on the line 3—3 of FIG. 1.

With particular reference to the drawings, the present mechanism comprises a base 10 in the form of a housing having defining side walls 12 and end walls 14, the top of the housing being open. In a preferred construction, base 10 has pivotal movement on a platform 16 by means of a central pivot 18 and is supported at its outer portion by wheels 20 rotatably mounted in brackets 22 on the platform 16. The underside of base 10 has a ring gear 24 in mesh with a pinion gear 26 driven from a gear box 28 in turn driven by the output shaft of an electric motor 30 mounted on the platform 16. By suitable operation of the motor 30, the base 10 can be driven around to a desired position according to wind direction.

Projecting up from the top of the housing 10 along each side thereof is an arcuate frame member 34. The space between these two members is open. A plurality of sprocket wheels 36 are rotatably supported on shafts 37 which project inwardly from each of the arcuate frame members. These sprocket wheel assemblies are arranged in laterally disposed pairs and are placed along the arcuate frame member 34 as necessary. Sprocket wheels 38 on inwardly extending shafts 39 are also disposed in a straight line along the side walls 12 of the base 10.

Endless carrier chains 40 operate over the two sets of sprocket wheels, and these chains at spaced links thereon have roller mechanisms 42 extending integrally between the two chains.

The roller mechanisms 42 support the outer ends of sail-type vanes 44. The inner ends of the vanes are connected to idler members comprising wheels 46 freely rotatable on inwardly projecting shafts 48 integral with side walls 12. Connection of the vanes 44 to the idler members 46 is accomplished by any suitable means such as by rings 50 having eye connection with the vanes and the idler members.

The idler members 46 are located at the center of the arcuate frame members 34 and the sprocket wheels 36 around the frame members 34 are substantially concentric with such idler members.

A front one of the sprocket wheels in the assemblies is designated by the numeral 36a. This sprocket wheel comprises a double sprocket wheel and has driving relation with a chain 52 engageable with a lower sprocket wheel 54 secured on a cross shaft 56 having suitable journaled support in the base. Shaft 54 comprises the output shaft of the mechanism and may have suitable connection to means to be driven such as a generator, pump, etc.

In the operation of the present invention mechanism the base 10 is rotatably located by suitable operation of motor 30 so that one end thereof, namely, the right-hand end in FIG. 1, faces the wind. The driving force of the wind against the vanes 44 moves the chains 40 around the sprocket wheels 36 and 38. That is, as the upper ends of the vanes reach the front of the mechanism, such upper ends are moved up so as to be engaged by the wind to provide the driving force. As they move rearwardly and start back along the straight return run they collapse and are not influenced by the wind. The idler members 46 rotate with the inner ends of the vanes as the upper ends of the vanes move around the drive and return runs. Idler members 46 provide the necessary anchor for the inner ends of the vanes when they are being powered by the wind.

In the structure shown and described, which utilizes a base 10 in the form of a housing with defining walls, the sails hang free in their return run to provide a minimum of return wear and friction and in addition the housing prevents any reverse influence of the wind on the sails.

According to the present invention, a wind driven power mechanism is provided that is extremely simplified in construction and is inexpensive to manufacture. At the same time the structure provides a full sail-type utilization of the driving force of the wind.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A wind driven power mechanism comprising (a) a base having forward and rearward ends and arranged to be disposed longitudinally in the direction of wind movement, (b) a pair of opposite, parallel endless carriers supported at opposite sides of said base for movement in the direction of the wind over an upper arcuate drive run and along a lower horizontal return run in the direction against the wind, (c) a plurality of flexible sail-type vane means having upper and lower ends, (d) means connecting the upper ends of said vane means laterally between said two endless carriers, (e) said vane means having movement along the upper run of said carriers in upright sail condition for surface engagement by the wind for driving the carriers longitudinally and having movement along the return run of said carriers in a collapsed condition uninfluenced by the wind, (f) a pair of horizontal axis idler wheels on said base disposed between said upper and return runs and being concentric with said upper arcuate drive run, (g) and means connecting the lower ends of said vane means to respective ones of said idler wheels whereby the lower ends of said vane means rotate with said idler wheels as the vane means move around the latter in the drive and return runs by wind engagement in the drive run of the carriers.

2. The wind driven power mechanism of claim 1 wherein said carriers comprise endless chains operating over sprocket wheels located along said runs, said means which connect the upper ends of said vane means between said endless carriers comprising a plurality of freely rotatable cross rollers.

* * * * *